May 31, 1932.   L. B. SAWYER   1,860,752
AUTOMOBILE SEAT HEAT INSULATOR
Filed Aug. 28, 1929
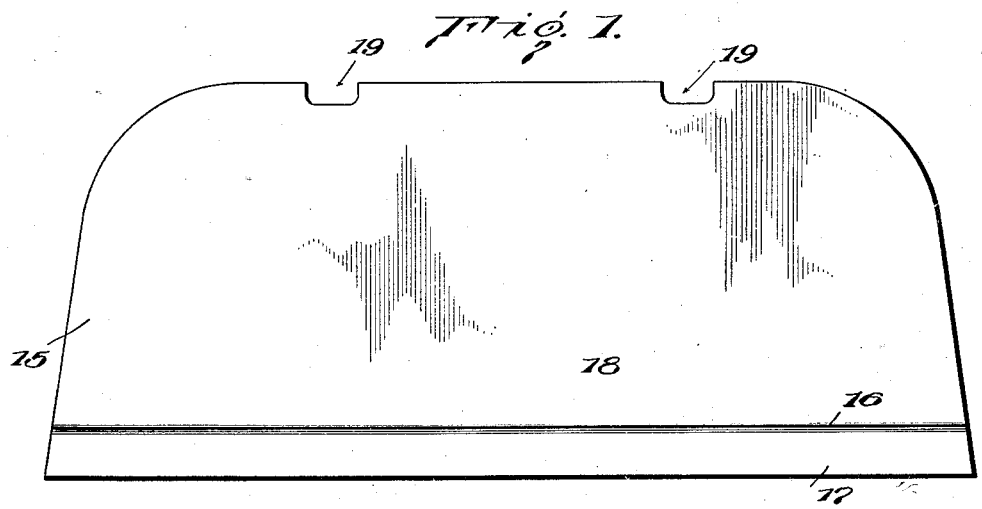
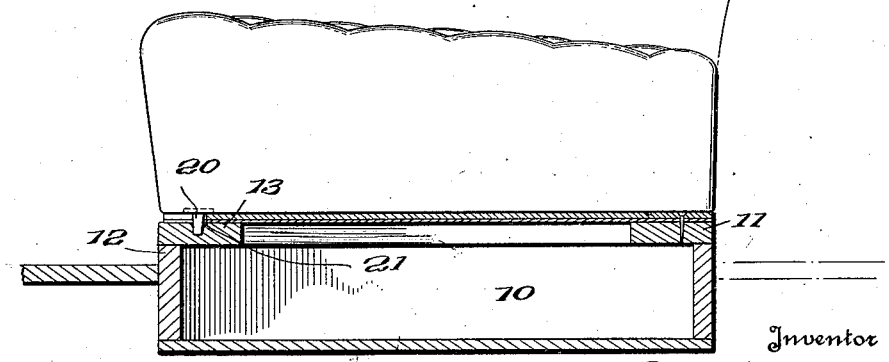
Inventor
L. B. Sawyer,
By Church & Church
his Attorneys Patented May 31, 1932

1,860,752

UNITED STATES PATENT OFFICE

LEICESTER B. SAWYER, OF AUBURN, NEW YORK, ASSIGNOR TO THE PROTECTAHOOD CORPORATION, OF AUBURN, NEW YORK, A CORPORATION OF NEW YORK

AUTOMOBILE SEAT HEAT INSULATOR

Application filed August 28, 1929. Serial No. 389,005.

This invention relates to improvements in means for insulating or protecting the seat of an automobile from heat dissipated or radiated from the motor of an automobile.

One of the principle features of present day automobile construction, is the tendency toward high compression motor units. With these motors of comparatively higher compression, a much larger amount of heat is generated and the heated air entering the front seat compartment of the automobile appreciably affects the comfort of the passenger. Again, in a large number of cars, the exhaust pipe and the muffler is located almost directly under the front seat. The heated air rising from this pipe and the muffler gradually heats up the seat, further affecting the comfort of the passenger. In view of this, the present invention has for its primary purpose the provision of an insulating element to prevent any heated air coming in contact with the bottom of the seat or passing through any openings in the flooring of the car beneath the seat.

In a number of instances, the cars are so constructed that there is a cavity below the seat cushion for the storage of the tools usually carried in a car. Accordingly, the present insulating member is preferably formed with a hinge portion adapted to be permanently attached below the seat cushion and a body portion hinged thereto, whereby said body portion may be lifted to give access to the tools in such cavity or tool chest.

In the accompanying drawings illustrating the preferred embodiment of the present invention,—

Figure 1 is a plan view of an insulating pad especially adapted for use under the cushion of the front seat of an automobile;

Fig. 2 is a cross sectional view of said pad; and

Fig. 3 is a sectional view of the pad installed under the seat cushion.

As has been stated, in most cars there is a depression or cavity 10 beneath the seat for the storage of tools. At the rear of said cavity there is usually a strip of wood 11, while at the front there is a pair of upright strips of wood 12 and one or more horizontal strips 13. In accordance with the present invention, the insulating member is of sheet like formation, as shown in Fig. 1. It may, of course, be made of various heat insulating material, but, in the present instance, it is shown as consisting of a sheet of asbestos paper 14 lined on its upper surface with jute board 15. This composite sheet conforms in size to that of the bottom of the seat cushion so as to seal off, so to speak, the entire space beneath the cushion, regardless of whether or not the tool chest 10 extends the full width of the seat. This is important because, in some cars, the tool chest extends only partially across the car, an opening being left beneath the seat for the batteries and a large volume of air gains access to the seat through such opening.

Preferably, this sheet is formed with a crease 16 extending across it rather close to one edge thereof. This crease divides the sheet into what is termed the hinge portion 17 and the body portion 18. In installing the insulator the hinge portion 17 is permanently attached to the wood strip 11 at the rear of tool chest 10 with the hinged body portion 18 resting at its forward edge on the strip or strips 13, said forward edge having portions cut out as at 19 for accommodation of the upright pieces 12.

When the seat cushion is in place the entire bottom thereof is protected by the insulator and practically no hot air from the motor or the exhaust pipe and muffler can come into contact therewith. This it true even though the machine be of the type wherein a portion of the space beneath the cushion is left open for the usual batteries as before mentioned.

What is claimed is:

1. An accessory for use directly beneath the seat cushion of an automobile having a conduit for exhaust gases which passes beneath the cushion support and adjacent a compartment accessible by displacing said cushion comprising, a panel of heat insulating material of substantially the same size and shape as the cushion with which it is to be used, said panel having a score or crease formed therein which divides the panel into a narrow strip adapted to be secured to the cushion support along its rear edge, and a body portion integrally hinged at said score to said strip and displaceably covering and insulating said compartment and said conduit from heat transfer to said cushion.

2. An accessory for use directly beneath the seat cushion of an automobile having a conduit for exhaust gases which passes beneath the cushion support and adjacent a compartment accessible by displacing said cushion comprising, a panel of heat insulating material consisting of a sheet of asbestos backed with a sheet of jute board said panel being of substantially the same size and shape as the cushion with which it is to be used, said panel having a score or crease formed therein which divides the panel into a narrow strip adapted to be secured to the cushion support along its rear edge, and a body portion integrally hinged at said score to said strip and displaceably covering and insulating said compartment and said conduit from heat transfer to said cushion.

LEICESTER B. SAWYER.